UNITED STATES PATENT OFFICE 1,988,636

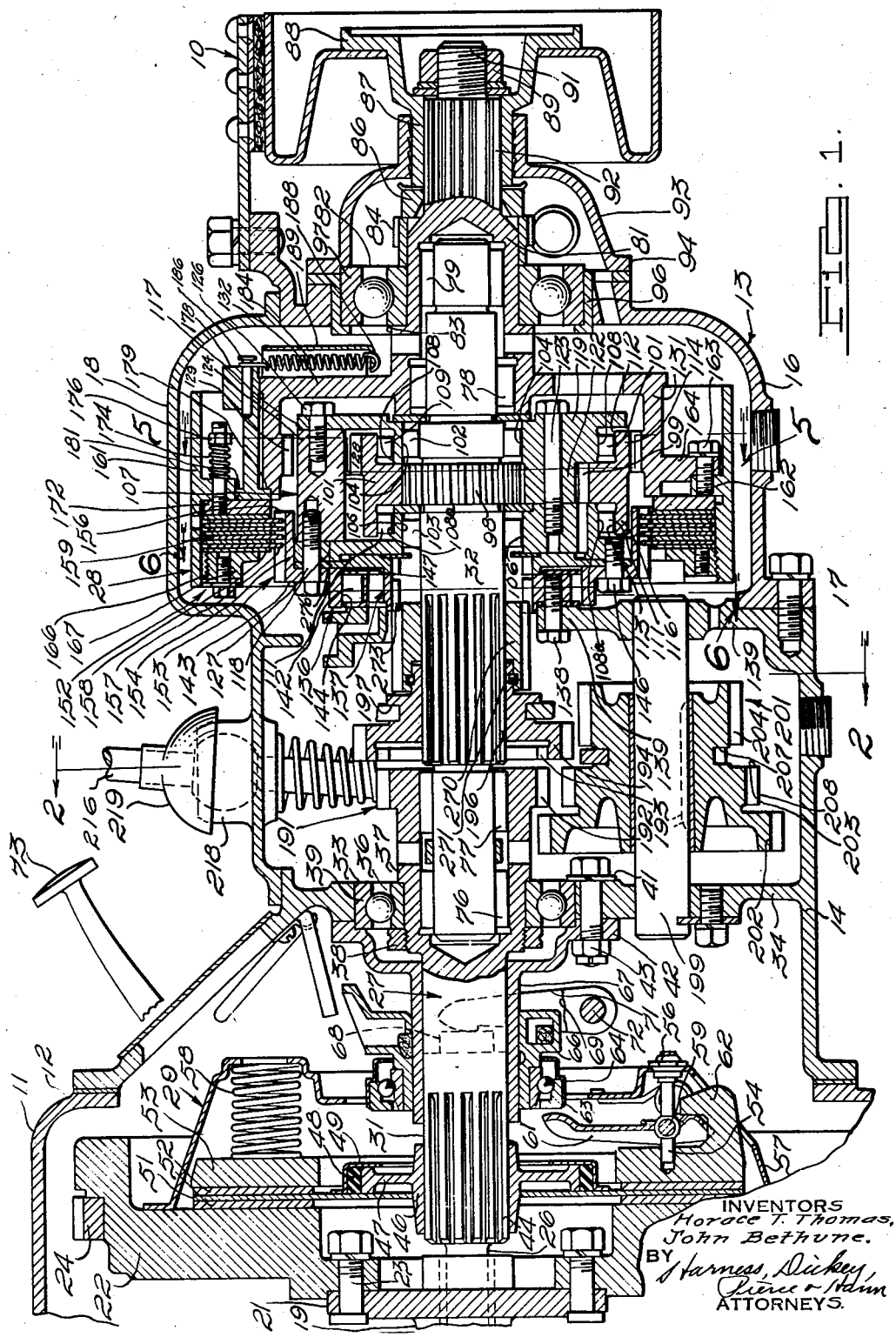

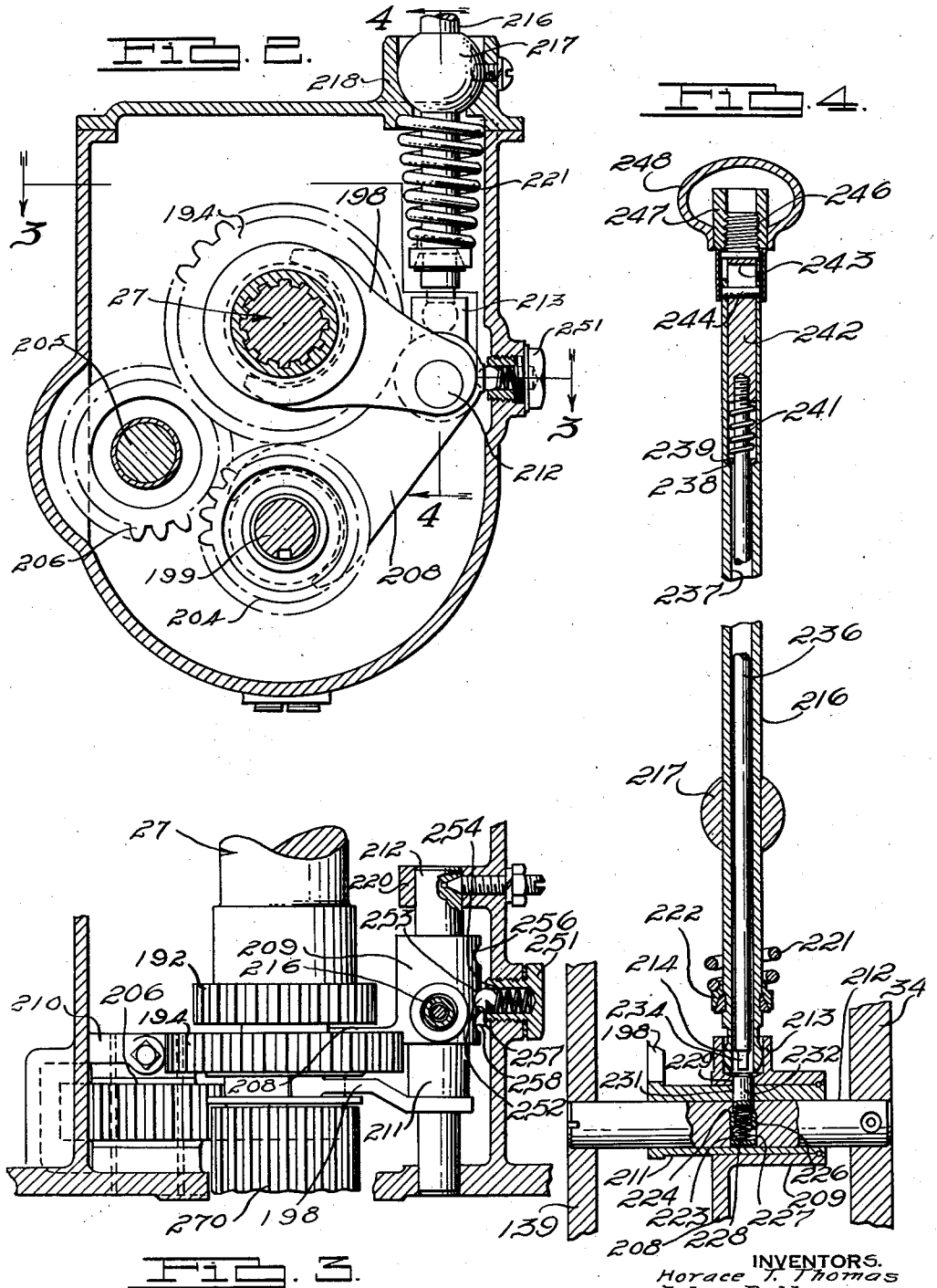

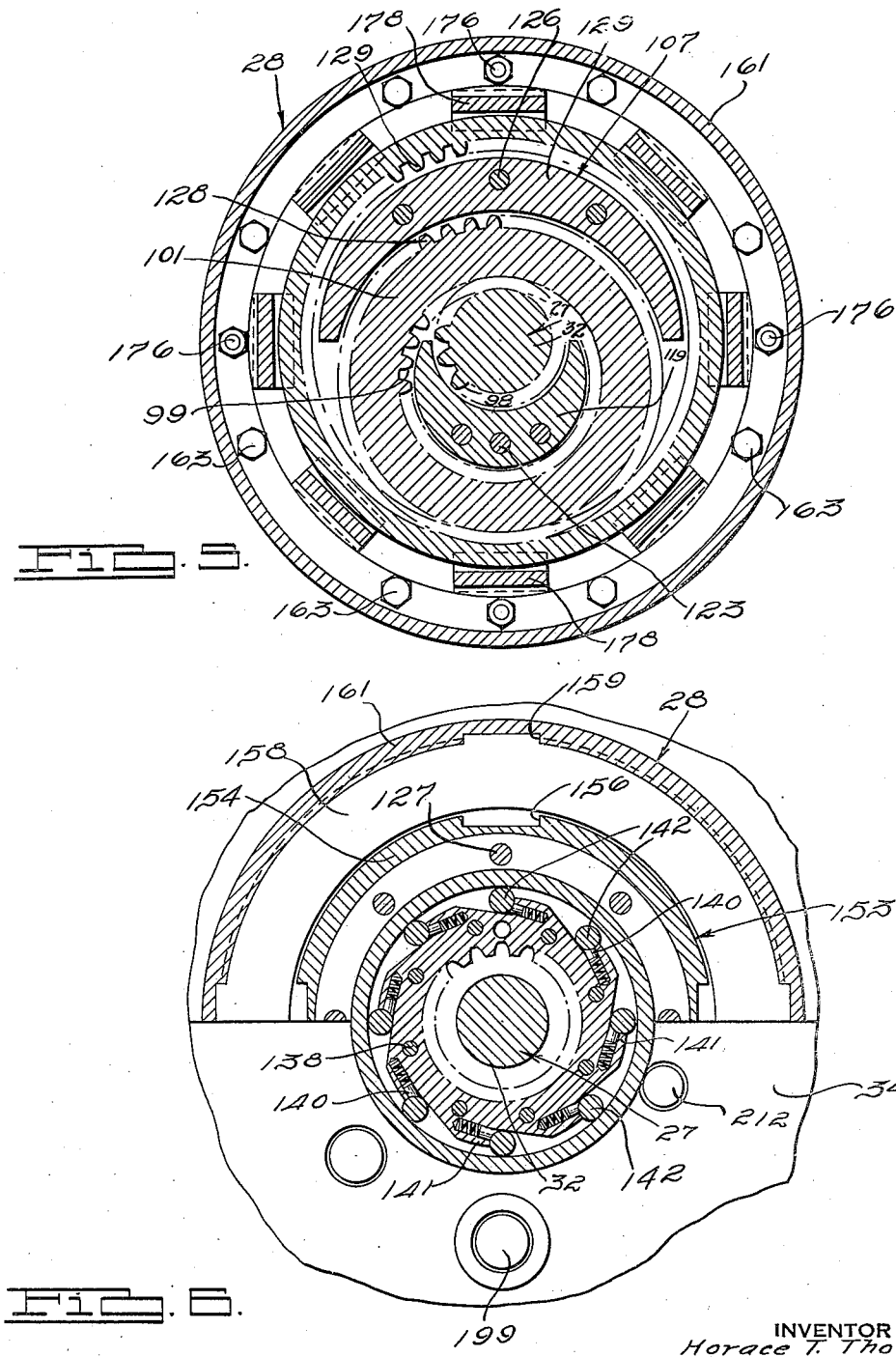

TRANSMISSION MECHANISM

Horace T. Thomas and John Bethune, Lansing, Mich., assignors to Reo Motor Car Company, Lansing, Mich., a corporation of Michigan Application February 12, 1932, Serial No. 592,580
Renewed October 5, 1934

10 Claims. (Cl. 74—260)

This invention relates to motor vehicles and has particular relation to a novel form of gear shifting mechanism therefor.

An object of the invention is to provide a transmission mechanism capable of automatically and continuously varying the speed and the torque ratio between an engine crank shaft and a propeller shaft of a motor vehicle during the initial period of acceleration of the vehicle or during any other period depending upon the varying conditions of operation to which the vehicle is subjected.

Another object of the invention is to provide for the application of a varying torque to the propeller shaft of a motor vehicle without the necessity for repeating at intervals the various clutch and gear shifting operations which are now required for the accomplishment of this end.

Another object of the invention is to provide an automatic and continuous speed and torque changing mechanism which can be totally disconnected from the clutch of a motor vehicle during the operation of the gear shifting lever thereof in order that the inertia of the various speed changing parts of the mechanism will not delay the execution of the desired gear shifting movement.

Another object of the invention is to combine a progressively varying and vehicle controlled speed changing mechanism with an intermittently varying and manually controlled speed changing mechanism.

Another object of the invention is to provide a transmission mechanism which will drive the vehicle forwardly at an increasing speed ratio relative to the engine until the speeds of the vehicle and engine are substantially equal, and which will drive the vehicle rearwardly at a constant ratio of speed relative to the engine.

Another object of the invention is to provide, for normal driving purposes, a speed changing mechanism which will continuously vary the speed of the engine relative to that of the vehicle until the engine crank shaft speed is equal to the vehicle propeller shaft speed and which, for the purpose of emergency operation, can be made to begin at a higher speed reduction ratio and vary the engine speed relative to the vehicle propeller shaft speed in like continuously changing manner until a constant ratio wherein the propeller shaft speed is materially less than the engine speed is arrived at.

Another object of the invention is to provide a transmission mechanism which is controlled automatically by the vehicle throttle opening to change from a reduced to a direct driving ratio at different vehicle speeds, thus rendering it possible to accelerate the vehicle rapidly and to continue to drive the propeller shaft thereof at a reduced ratio in which a high engine torque is applied and until the vehicle attains a relatively high speed, or, which can be employed to accelerate the vehicle slowly and to obtain the direct driving of the propeller shaft when the speed of the vehicle is at a much lower value.

The particular embodiment of the invention disclosed herein for the purpose of illustration comprises generally a speed changing and torque multiplying mechanism through which a large speed reduction occurs between driving and driven shaft thereof when the vehicle is initially started. This speed changing and torque multiplying mechanism however does not continue to drive the vehicle at the same speed changing and torque multiplying ratio but as soon as the vehicle has been started the speed reduction and torque multiplying ratio of the device is gradually decreased by the operation of a centrifugally actuated device effected by the speed at which the vehicle is driven. Such ratio continues to change until finally the driving and driven shaft of the mechanism are directly connected to rotate at the same speed.

This mechanism is not connected directly to the ordinary manually operated friction clutch by which the vehicle is started but interposed between such elements is a shaft connecting and disconnecting mechanism which is controlled by a gear shift lever available for manipulation by the vehicle operator. Such connecting and disconnecting mechanism permits the heavy rotating parts of the speed changing mechanism to be disconnected from the driven element of the manually controlled friction clutch to thus permit the speed of rotation of such latter element to decrease rapidly during the shifting of gears.

The shaft connecting and disconnecting mechanism also embraces a selective speed reduction gear train which may be employed optionally in emergencies for increasing the speed reduction and torque ratio of the transmission mechanism and for reversing the direction of rotation of the propeller shaft relative to the crank shaft to provide means for driving the vehicle in a reverse direction.

In the drawings:

Fig. 1 is a longitudinal sectional view through a power transmission mechanism and other parts of a motor vehicle embracing the principles of the invention;

Fig. 2 is a transverse sectional view through the power transmission mechanism illustrated by Fig. 1 and is taken substantially on line 2—2 thereof;

Fig. 3 is a horizontal sectional view of a portion of the power transmission mechanism as it might appear substantially in the plane of line 3—3 on Fig. 2;

Fig. 4 is a vertical sectional view through a part of the power transmission mechanism and the shifting lever associated therewith as such parts might appear on line 4—4 in Fig. 2;

Fig. 5 is a transverse sectional view through the transmission mechanism as it might appear on line 5—5 of Fig. 1, and Fig. 6 is a transverse sectional view of the power transmission mechanism as it might appear looking in a direction opposite to that in which Fig. 5 is taken and in the plane of line 6—6 of Fig. 1.

Referring particularly to the drawings, the engine is embraced in a motor vehicle 10 having an engine 11 terminating in a clutch housing 12 having an open rear end to which is attached a transmission mechanism housing 13. The housing consists of a pair of separable sections 14 and 16 secured together by cap screws 17 and both of which sections are provided with openings at the upper extremities thereof which are normally closed by a removable cover 18.

An engine crank shaft 19 projecting rearwardly into the clutch housing 12 is provided at its end with a circular flange 21 to which an engine flywheel 22 is attached by bolts 23. Around the outer periphery of the flywheel 22 is secured a ring gear 24 which is driven by an electric motor, not shown, for starting the engine.

Projecting within an axial opening formed within the rear end of the crank shaft 19 is a pilot end 26 of a shaft 27 by means of which a power transmission mechanism 28 contained within the housing 13 is driven through a manually controlled friction clutch 29. The shaft 27 consists of a pair of independent sections 31 and 32, the first of which is journaled at its forward end on the pilot 26 projecting within the crank shaft 19 and at its rear end in a ball bearing 33 which is mounted in a central opening formed in a web portion 34 projecting transversely across the transmission housing section 14.

The inner race 36 of the bearing 33 is secured on the shaft section 31 against a shoulder 37 formed thereon by a threaded ring 38, while the outer race 39 is secured by bolts 43 in the opening in the web 34 between washers 41 and a ring 42. The end of the shaft section 31 adjacent the pilot 26, as is indicated at 44, is splined to a sleeve 46 from which a circular flange 47 projects outwardly from the periphery thereof. On the outer extremity of such flange is disposed an annular rubber cushion member 48 in turn surrounded by a flanged annular bracket 49 which is welded or otherwise secured at one end to the inner edge of an annular friction clutch disc 51.

On the opposite surfaces of such discs are disposed suitable rings of wear resisting material, indicated at 52, one of which is adapted to engage the rear surface of the flywheel 22 while the other is engaged by the adjacent surface of an annular clutch pressure ring 53. The ring 53 is slidably disposed on the forward end of a plurality of studs, such as that indicated at 54, which are arranged in spaced relation around the periphery thereof and are secured by adjustable sockets 56 in the rear end of a clutch mechanism cage 57 secured to and carried by the flywheel 22 in its rotational movement. A plurality of springs such as that indicated at 58 are disposed within the cage 57 between the rear extremity of the cage and the pressure ring 53. These springs tend to move the pressure ring 53 forwardly and to compress the disc 51 between the adjacent surfaces of the pressure ring and the flywheel.

When the disc is thus engaged by the flywheel and the pressure ring, the crank shaft 19 tends to rotate the shaft section therewith.

In order to release the disc 51 to permit the flywheel 22 and the ring 53 to rotate independently of the disc 51, the studs 54 have pivoted intermediate their ends, as is indicated at 59, a plurality of radially disposed levers 61, the outer ends of which are engaged within rearwardly and inwardly projecting lugs 62 formed integrally with the clutch pressure ring 53. The rear surfaces of the inner ends of these levers are adapted to be engaged by a freely rotatable race 63 of a thrust bearing 64, the inner race of which is secured on a shift ring 66 which in turn is slidably mounted on a sleeve 67 surrounding an intermediate portion of the shaft section 31 and formed integral at one end with the web support ring 53 heretofore referred to.

The opposite sides of the shift ring 66 are provided with outwardly projecting lugs 68 engaged by the upper extremities of a pair of arms 69 and 71 mounted in spaced relation upon a clutch shaft 72 which is journaled at opposite ends in bearings formed in the housing section 14. One end of the shaft 72 projects outwardly through the housing section 14 and has secured thereon a clutch operating pedal 73 which is adapted to be depressed manually by the vehicle operator for releasing the clutch 29.

When the pedal is depressed, the rotation of shaft 72 moves the shift ring 66 forwardly on the sleeve 67 thus causing the thrust bearing 64 to engage the inner extremities of the levers 61, the opposite ends of which move the pressure rings 53 rearwardly against the springs 58 to release the disc 51 from between the pressure ring in the flywheel 22.

On spaced pairs of roller bearings 76 and 77 disposed inside of an axial opening extending into the rear end of the shaft section 31 is rotatably mounted a pilot end of the shaft section 32, while the rear pilot end of such shaft section is likewise rotatably mounted, by means of spaced pairs of roller bearings 78 and 79, in an axial opening formed in the front end of a driven or propeller shaft 81.

Outwardly of the bearings 78 and 79, the outer surface of the driven shaft 81 is rotatably mounted within a ball bearing 82, the inner race of which is secured against a shoulder 83 formed on the shaft 81 by a speedometer driving gear 84, by a spacing ring 86, by a sleeve 87 having a circular flange 88 at the rear end thereof, and by a nut 89 secured on the reduced and threaded end 91 of the shaft 81. The inner surface of the sleeve 87 is splined to the shaft 81, as is indicated at 92, while the outer surface thereof is surrounded by a cap 93, the flanged end 94 of which cooperates with a bracket 96 in retaining the outer race 97 of the bearing 92 in position within an opening in the rear end of the casing section 16 through which the shaft 81 projects. The shaft 81 is really a continuation of the vehicle propeller shaft, the rear section of which is attached directly to the circular flange or shaft coupling member 88. The cap 93 and bracket 96 are held in position against the casing section 16 by means of cap screws (not shown).

Slightly in front of the bearings 78 and 79, in which the rear end of the shaft section 32 is mounted in the forward end of the driven shaft 81, is rigidly secured upon the shaft section 32 a spur gear 98 which is concentric relative to the shaft section 32 but which meshes with the internal teeth 99 of an internal-external gear 101 disposed thereabout in eccentric relation to the axis of the shaft section 32. Roller bearings 102 and 103, engaging the shaft section 32 and disposed on opposite sides of the gear 98, rotatably engage inwardly curved supporting races 104 and 106 of a rotating gear cage 107. Formed on the gear cage 107 outwardly beyond the annular races 104 and 106 and disposed in eccentric relation thereto are a pair of outer annular races 108 and 108$^a$ on which likewise are rotatably disposed parallel roller bearings 109 and 111. These rollers in turn engage inner annular races 112 and 113 formed inside the laterally extending and flanged edges 114 and 116 of the internal-external ring gear 101.

The cage 107 consists of a pair of spaced annular side members 117 and 118 having integral and inwardly projecting arcuate portions 119 and 121 of variable cross section formed thereon and on the inner and outer surfaces of which races 104 and 106, and 108 and 108$^a$ are formed. Extending between such portions and integral with the arcuate portion 119 is a crescent shaped boss 122 which is disposed symmetrically with respect to the widest portions of the arcuate and inwardly projecting portions 119 and 121, and between the remote side of the ring gear 101 and the spur gear 98. In this region the side members 117 and 118 are secured together, through such inwardly projecting portions, by cap screws indicated at 123. Diametrically across the cage 107 from the crescent shaped boss 122 is a similar crescent shaped boss 124 and to which the side members 117 and 118 are secured by cap screws 126 and 127.

In a region diametrically opposite to that at which the internal gear teeth 99 mesh with the spur gear 98 and wherein the outer surface of the ring gear 101 is most remote from the axis of the shaft section 32, gear teeth 128 formed around the outer periphery of the ring gear 101 mesh with internal gear teeth 129 formed around the inner periphery of an annular flange or driven ring 131 which is integrally connected by a circular web 132 to the forward end of the driven shaft 81.

It is apparent that if the shaft section 32 is rotating in one direction it will tend to rotate with it the internal and external gear 101. Should the external teeth of the ring gear be required to exert a considerable force against the gear teeth 129 in rotating the ring 131 and the shaft 81 the cage 107 may tend to rotate in a direction opposite to the rotation of the shaft section 32, thus tending to move the ring gear 101 around the outside of the rotating gear 98 without actually causing rotation of the ring gear.

Such rotation of the cage 107 in a direction opposite to the rotation of the shaft section 32 is prevented however by the operation of an overrunning clutch 136, the stationary element 137 of which is secured by stud bolts 138 around the edge of a circular opening formed in a web 139 extending partially across the rear end of the housing section 14 and through which opening the shaft section 32 projects. The outer periphery of the stationary element 137 is formed with a plurality of sloping teeth 139 having disposed on corresponding sides thereof a plurality of rollers 142. Disposed within openings formed in the more nearly radial sides of the teeth 139 are spring pressed cups 140 which tend to urge the rollers upwardly upon the more sloping sides of the teeth.

Surrounding the stationary element 137 is a movable element 143 having a circular internal race 144 adapted to engage the rollers 142 during the operation of the clutch. A radially formed flange portion of the movable element 143 is secured to one side of the cage 107 adjacent the outer edge thereof by the stud 127, in the region of the crescent shaped member 124, and by studs 146 spaced elsewhere around the periphery thereof.

When the cage 107 tends to rotate in a direction opposite to the rotation of the shaft section 132, the rollers 142 will roll towards the outer extremities of the teeth 139 and will be clamped between the sloping surfaces of the teeth and the race 144. However, the rollers 142 will not prevent the cage from rotating in the opposite direction, because under such circumstances they will merely roll downwardly upon the sloping surfaces of the teeth 139 and away from clamping engagement with the race 144. The rollers are held in proper position relative to the stationary element 137 by annular plates 147 and 148 clamped to the stationary element on opposite sides thereof and loosely engaging the rollers 142 at the outer edges thereof.

Owing to the difference in the number of teeth on the spur gear 98 and the internal teeth of the ring gear 101, and also, owing to the difference in the number of external teeth on the ring gear 101 and the number of internal teeth on the driven ring 131, it is apparent that when the shaft section 32 is rotating it will drive the driven shaft 81 at a greatly reduced speed, assuming the gear cage 107 to be prevented from rotating in an opposite direction by the overrunning clutch 136.

In order to gradually increase the speed of the shaft 81 to a speed equal to that of the shaft section 32, there is provided a centrifugally actuated friction clutch 152, the operation of which tends to initiate the rotation of the cage 107, to increase the relative movement between the cage and the ring gear 101, and to increase gradually the speed of rotation of the cage and that of the ring 131 driving the shaft 81 until the rate of rotation of the shaft 81 is equal to that of the shaft section 32.

The driven element 153 of the clutch 152 comprises an annular ring 154 formed integral with the outer edge of the movable element 143 of the overrunning clutch 136 and extending around the outer surface of the cage 107 upon the side thereof opposite the driven ring 131. The outer surface of the ring 154 is provided with a plurality of spaced and conversely extending ribs 156 on which are loosely mounted a plurality of spaced friction discs 157. These discs are interposed between a plurality of slightly larger discs 158 which are likewise loosely disposed upon transversely extending ribs 159 formed around the inner periphery of a clutch casing 161. This casing has inwardly projecting annularly arranged lugs 162 which are secured by bolts 163 to outwardly projecting lugs 164 formed on the adjacent edge of the driven ring 131. The forward ends of the transversely projecting ribs 159 are threaded as indicated at 166 for the reception of an adjustable annular stop ring 167, the rear surface of which is disposed adjacent the discs 157 and 158 for limiting the movement thereof forwardly upon the ribs 156 and 159. Key plates 158 having the outer ends disposed between the ribs 159 are secured by studs to the front of the stop ring 167 to prevent the latter from becoming loosened. To adjust the ring the studs are loosened until the keys do not interfere with the rotation thereof.

Disposed in front of the web 162 and adjacent the rearmost one of the plates 158 is a movable pressure ring 172 which is secured rigidly on the forward ends of a plurality of rearwardly projecting studs 173 projecting rearwardly through openings formed in the lugs 162. Beyond the lugs 162 coil springs 174 are loosely disposed on the studs 163 and are secured thereon by nuts 176 engaging the threaded ends thereof.

The springs 174 tend to move the studs 173 rearwardly and likewise the pressure plate 172, thus permitting the friction rings 157 and 158 to be loosely disposed relative to one another; in which event, the casing 161 carrying the plates 158 can rotate with the driven ring 131 without rotating the plates 157 and the cage 107.

Disposed around the outer surface of the driven ring 131 and rotating therewith are a plurality of transversely disposed and centrifugally actuated weights 178, the forward ends of which are provided with radially inwardly and outwardly projecting lugs 179 and 181 respectively. The inwardly projecting lugs are adapted to pivot in recesses formed in the forward edge of the driven ring 131 and between the pairs of lugs 162 and 164. The outwardly extending lugs 181 are adapted to engage the rear surface of the pressure plate 172 and to move the plate forwardly to compress the discs 157 and 158 when the speed of rotation of the driven ring 131 is great enough to move the weights 178 outwardly.

While the springs 174 tend to oppose such outward movement of the weights 178 by retaining the pressure plate 172 in a retracted position adjacent the web 162 the weights also may be provided with springs 184 likewise tending to oppose the outer movement of the weights. Such springs are secured at one end to the weights by pins 186 therein and at the opposite ends to lugs 188 formed on the inner ends of radially inwardly extending shields 189 secured on the rear surface of the web 132 supporting the driven ring 131.

In order to connect the sections 31 and 32 of the power shaft 27 to cause such sections to be driven as a unit, either at the same speed or at different speeds, there is provided on the adjacent ends of the shaft sections and in a region adjacent thereto a selective gear shifting mechanism 191.

For driving the shaft sections at the same speed the rear end of the shaft section 31 is provided with a gear 192 with which clutch teeth 193 formed around the inner edge of a gear 194 are adapted to mesh. The latter gear is splined as is indicated at 196 upon the forward end of the shaft section 32 and has an annular groove 197 formed therein in which the forked ends of a shifting yoke 198 are rotatably disposed. Intermediate the ends of a shaft 199, secured in openings formed in the webs 34 and 139, is mounted a gear cluster 201 having a relatively large gear 202 adapted to mesh with the gear 192, a smaller gear 203 adapted to mesh with the gear 194, and a still smaller gear 204 adapted to remain continuously in mesh with the usual reverse idler 206. The latter is mounted upon a pin 205 secured at one end in the web 139 and at the opposite end in a boss 210 projecting from the housing section 14.

Between the gears 203 and 204 is formed an annular groove 207 which is adapted to rotatably receive the forked ends of a second shifting yoke 208 provided at its opposite end with a laterally projecting sleeve 209 which is mounted slidably upon a similar laterally projecting sleeve 211 formed on the shifting yoke 198. Both of such yokes are slidably mounted upon a shaft 212 projecting through the inner yoke sleeve 211 and secured at its opposite ends in the web 139 and a boss 220 projecting from the side of the housing section 14.

The outer sleeve 209 has a vertically extending socket 213 formed on the upper surface thereof in which projects the ball shaped end 214 of a shifting lever 216. Disposed intermediate the ends of the shifting lever 216 and preferably adjacent the lower end thereof is a spherically shaped member 217 which is journaled in an upwardly extending socket 218 formed in the upper surface of the transmission housing cover 18. The socket 218 and ball 217 are covered by a cap 219 secured on the lever 216 thereabove.

A spring 221, disposed between the cover 18 and a collar 222 disposed on the lower extremity of the shifting lever 116, tends to maintain the ball 214 resiliently in the socket 213.

Extending transversely across the shaft 212 is a vertically disposed opening 223 having a shoulder 224 formed therein in which is slidably disposed a hollow cap 226 the upper end of which is flush with the outer surface of the shaft 214 when the cap is disposed against the shoulder 224. For maintaining the cap in this position there is employed a spiral spring 227 having one end abutting the cap and the other held in position by an arcuate disc 227 pressed into the lower end of the opening 223.

Formed in the sleeves 209 and 211 are a pair of normally aligned openings 229 and 231 in which are disposed a short pin 232, the lower end of which rests upon either the shaft 212 or the upper end of the cap 226 depending upon the position of the sleeves 209 and 211. Directly above the pin 232 is the lower end 234 of a push rod 236 which is slidably disposed in an opening 237 formed in the interior of the shift lever 216 from one end thereof to another. The upper end of the opening 237 is somewhat enlarged to provide a shoulder 238 on which is disposed a resilient guiding washer 239 adapted to hold the upper end of the rod 236 in its proper position and also to support the lower end of a coil spring 241, the upper end of which is engaged by a short rod 242 threaded on the end of the push rod 236 and of a diameter somewhat larger than the rod 236 and large enough to fit tightly within the enlarged portion of the opening 237. The upper end of the rod 242 is provided with an elongated slot 243 in which is disposed a pin 244 secured at its opposite ends in the upper end of the shift lever 216. Above the slot 243 the rod 242 is threaded as indicated at 246 for rigidly supporting an internally threaded collar 247 on the outer surface of which is secured a knob 248. The spring 241 holds the rod 236 in an elevated position with the pin 244 engaging the lower extremity of the slot 243 and the lower end 244 of the rod just out of contact with the pin 232.

Secured in a cap 251 threaded into an opening formed in the housing section 14 is a spring pressed detent 252 consisting of a ball 253 pressed outwardly by a spring 254 between the ball and the cap 251. Formed in the outer surface of the sleeve 209 are a plurality of openings 256, 257 and 258 which cooperate with the detent mechanism to maintain the sleeve in any desired position.

The arrangement of the openings is such that when the detent mechanism 253 is engaged in the opening 257, as is indicated by Fig. 3, the sleeves 209 and 211 are disposed in a position indicated by Fig. 4 and the gears 192 and 194 are in such position, as is indicated by Fig. 1, that the shaft section 31 can rotate independently of the shaft section 32. In such position the gear cluster 201 is not engaged by any part of the mechanism except that the gear 204 engages the reverse idler 206 at one edge thereof.

With this relation of parts the transmission mechanism is said to be in neutral position.

In the operation of a motor vehicle or other power consuming device with which the invention may be employed, the crank shaft 19 of the engine 11, may run at any speed when the shift lever 216 is in the aforesaid neutral position and the only effect will be the rotation of the flywheel and clutch element 29, and the shaft section 31 up to and including the gear 192 with which the engine is connected by the operation of the clutch. When it is desired to drive the vehicle forwardly the operator simply depresses the clutch pedal 73, thus releasing the clutch 29 to permit the shaft section 31 to come to rest, and then, after grasping the knob 248, pulls the shift lever 216 rearwardly until the detent mechanism 253 engages the recess 256, thus shifting the sleeves 209 and 211 forwardly as a unit upon the shaft 212. Such movement of the sleeves also moves the shifting yokes 198 and 208, which in turn move the clutch teeth 193 on the gear 194 forwardly into contact with the teeth of the gear 192, and also move the cluster 201 forwardly into such position as to be out of the way of the gear 194. In such position the shaft sections 31 and 32 of the driving shaft 27 are connected directly together by the gear 192 and clutch teeth 193 for rotation at equal speeds.

When thereafter the clutch pedal 73 is gradually released, the disc 51 is engaged between the pressure plates 53 and the rear surface of the flywheel 22, thus causing a gradually accelerating rotation of both sections 31 and 32 of the driving shaft 27. The rotation of the gear 98 resulting from the rotation of the shaft 27 tends to cause either the ring gear 101 to rotate in the same direction with it or the cage 107 to rotate in the opposite direction. Owing to the presence of the overrunning clutch 36, however, the cage 107 cannot rotate in a direction opposite to the normal direction of rotation of the shaft 27 and consequently the ring gear 101 is compelled to rotate eccentrically about its axis, which is parallel to the axis of the shaft 27, and in the same direction in which the latter shaft is rotated.

Owing to the intermeshing teeth 128 and 192 between the outer surface of the ring gear 101 and the inner surface of the driven ring 131 respectively, the rotation of the ring gear 101 causes the driven ring 131 to rotate and the latter to rotate the driven shaft 81.

Because of the two different stages of reduction in motion between the shaft 27 and the driven ring 131, due to the difference between the number of teeth on the interior surface of the ring gear 131 and the gear 98 and also to the difference in the number of teeth on the interior surface of the driven ring and the outer surface of the ring gear, the driven shaft 81 rotates at a materially lower speed but transmits its power at a materially higher torque than the shaft 27.

With the power of the engine thus applied to the vehicle by the driven shaft 81 the vehicle is slowly started and moved forwardly at a slightly accelerating rate as the pressure plate 53 of the clutch 29 gradually is released against the clutch disc 51. As soon as the driven ring 131 begins to rotate, and as a result of which the vehicle is driven forwardly, the weights 178 carried by the driven ring tend to rotate outwardly upon their inwardly projecting ends 179 and the pressure plate 172 tends to press the friction plates 157 and 158 more tightly together. As these weights continue to move outwardly, due to the increase, the increased centrifugal force caused by the increase in rate of rotation of the driven ring 131, the plates 158, which rotate with the driven ring, tend to seize the plates 157 and to carry the latter in the same direction of rotation. Such rotation of the plates 157 in the same direction as the ring 131 also rotates the cage 107, to which the plates are secured, in the same direction as the shaft 27 and the driven ring 131.

This rotation of the cage 107 tends to reduce the relative motion between the cage and the ring gear 101 until finally when the plates 157 and 158 become so tightly engaged that there is no relative motion between them there is also no relative motion between the ring gear 101 and the cage 107. Under such conditions the ring gear 101 ceases to rotate upon the gear teeth 98 but instead, the cage 107 and the driven plate 131 all are carried as a rigid unit upon the shaft 27 without relative motion between the gear 98 and such rotating unit. Under such conditions the driven shaft 81 is driven at the same rate of rotation as the driving shaft 27 or, in other words, the vehicle is directly connected to the engine for operation at what is commonly known as high speed.

It will be observed that this change from a lower starting speed to a directly driven high or normal driving speed all took place as a result of the outer rotation of the weights 178 which is caused by the motion of the vehicle.

The shifting lever 216 merely is employed for the purpose of directly connecting the two shaft sections 31 and 32 and thereafter the torque transmitted by the driven shaft 81 varies inversely as the increase in speed of the shaft due to the automatic operation of the speed changing mechanism 28.

While any desired range of automatic gear reduction may be had merely by changing the number of teeth on the various gears employed in the speed changing mechanism it may be desirable under some circumstances not to have too great a reduction in the speed changing mechanism 28 and to employ in addition thereto a selective gear reduction mechanism in order to be able to employ in emergencies a considerably higher torque than that which the gear changing mechanism 28 is designed to deliver for normal vehicle operating conditions.

In such emergencies in order to bring such selective gear reduction mechanism into operation, the vehicle operator, after disengaging the clutch 29, merely depresses the knob 248 as far as it will go, or, until the upper end of the slot 243 engages the pin 244, in which event the lower end 214 of the rod 236 will depress the pin 232 downwardly into the upper extremity of the opening 223. When the pin is so depressed it will lock the sleeve 211 to the shaft 212 and as a result thereof the gears 192 and 194 also will be locked in the position which they occupy in neutral when the shaft sections 31 and 32 are disconnected. Such movement of the rod 236 causes the pin 232 to be depressed below the inner surface of the sleeve 209 and consequently the latter sleeve can be moved independently of the sleeve 211. The operator then pushes the knob 248 of the shift lever 216 forwardly until the detent mechanism 252 engages the notch 258 and the resultant movement of the sleeve 209 and the yoke 208 moves the cluster 201 rearwardly until the gear 202 meshes with the gear 192 and the gear 203 meshes with the gear 194.

By driving the shaft section 32 from the shaft section 31 through such train of rotating gears the rotation of the former shaft section is reduced relative to the latter and the torque delivered thereby is proportionally increased.

Notwithstanding the rotation of the two sections of the driving shaft 27 at such different speeds, the speed changing mechanism 28 is operated in the same manner as has been heretofore described except that the low and high speeds, from one to another of which the driven shaft 81 is automatically driven by the speed changing mechanism 28, both are lower than would be the case with the shaft sections directly connected.

When the emergency which renders desirable the employment of the extremely low speed has been overcome and the vehicle has speeded up at such low speed until the driven shaft 81 is driven at the same speed as the shaft section 32, or prior to such time if desired, the vehicle operator may depress the clutch 73 an instant and then pull the shifting lever 216 rearwardly until the detent 252 is engaged in the notch 258.

During the first part of said movement the sleeve 209 is moved independently of the sleeve 211 until the opening 229 in the sleeve 209 is directly over the upper end of the pin 232 (the rod 236 having previously assumed its normal position) and the spring 227 urges the pin upwardly into the opening 229. During the latter part of such movement both of the sleeves are carried upon the shaft 212 as a unit as during the normal gear shifting operation referred to in the beginning.

In order to reverse the motion of the vehicle, the vehicle operator pushes the knob 248 of the shifting lever 216 forwardly without depressing the knob thus moving both of the sleeves 209 and 211 rearwardly until the detent 252 engages the notch 258. During such movement the gear 194 and the gear cluster 201 will be moved rearwardly simultaneously until the gear 194 meshes with the reverse idler 206 and the gear 202 meshes with the gear 192 on the rear end of the shaft section 31. Under such conditions, when the clutch is released, the vehicle will be driven rearwardly at a relatively low speed under the influence of the gear reduction involved in such train of gears.

During the reverse movement of the vehicle however it may not be desirable to accelerate the rate of motion thereof by the automatic operation of the speed changing mechanism 28 and to prevent the operation of the latter the gear 194 has rotatably attached at the rear end thereof an externally toothed collar 270 which is movable longitudinally along the shaft section 32 with the gear but does not rotate therewith. The sleeve is secured to the gear at the overlapping edges of the two parts by an annular retaining ring 271 which operatively engages annular grooves formed therebetween.

When the gear 194 is in its neutral position the teeth on the sleeve 270 are adapted to mesh with the corners of a plurality of gear teeth 273 formed around the inner surface of the stationary element 137 of the overrunning clutch 136. Such teeth simply prevent the rotation of the sleeve 270 whenever they are in mesh although by reason of the connection provided by the ring 271 the gear 194 is not prevented from rotation. Just beyond the teeth 273 are a plurality of similar teeth 274 formed on the inner edge of an annular disc 276 secured by the stud bolts 127 and 146 between the cage 107 and the movable element 143 of the overrunning clutch 136 and by which such elements are secured together.

Hence when the shifting lever 126 is moved forwardly by the vehicle operator preparatory to reversing the motion of the vehicle, the collar 270 is moved rearwardly by the gear 194 until the teeth thereon slide beyond the teeth 273 and engage the teeth 274 which are associated with the cage 107. When the teeth of the collar 270 are so intermeshed with the teeth 273 and 274 the cage 107 is locked directly to the stationary element 137 of the overrunning clutch 136 and likewise to the web 139 of the housing 13.

Under such conditions the plates 157 are compelled to move relative to the plates 158 and the clutch 152 does not operate to carry the cage 107 with the driven ring 131.

The reduction in speed between the shaft sections 32 and 31, when the gears are in a vehicle reversing position, is such however that there is little tendency for the clutch 152 to operate, because the driven ring 131 does not rotate fast enough at such vehicle speed to create enough centrifugal force effecting the weights 178 to move the weights outwardly against the springs 174 and 184 far enough to press the plates together to any material extent.

While the structure as herein disclosed constitutes a preferred form and application of the invention, it is to be understood that other structures differing widely from that herein disclosed are within the scope of the invention as defined in the appended claims.

A transmission constructed and organized as described is unique in its performance and is adapted to successfully meet all conditions encountered in the driving of a motor car with less effort and skill on the part of the operator. Essentially this is due to the peculiar combination of the automatic and the manually controlled variable gear ratios which are so selected that for most ordinary driving manual shifting is unnecessary. On the other hand, control is not taken away from the driver as would be the case with a completely automatic transmission, for he is permitted to change ratios manually whenever desirable. Thus in any emergency the operator has as complete control of his machine as with any manually controlled transmission, but it is only occasionally that he needs to exercise his control.

The automatic change in ratio takes place upon variation in either speed or load of the driven member. For instance, if the car on a level pavement is stopped and then started without manual shifting of the gears, the low speed ratio first comes into action and as the speed of the car increases, progressively changes to a high speed ratio. The control is not, however, due solely to change in speed of the driven member, as it also takes place on change of load. Thus if the car operating at high speed ratio is suddenly accelerated, the increase in inertial load will at once throw the automatic gearing into the low ratio from which it progressively changes to high ratio as inertial resistance is overcome. The same would be true by a change in grade which throws additional load upon the driven member. On the other hand, even where the vehicle is traveling at low speed but is relieved of load as by a down grade, this will automatically throw the gearing into high speed ratio.

It is evident that with this automatic control no attention is required on the part of the operator, as the gearing will of itself change in ratio according to conditions met. If, however, the driver desires an exceptionally rapid acceleration, by shifting manually from high to low ratio, he can accomplish this as well as with any completely manually controlled transmission. Again, under exceptional load by manually shifting to low, he can increase the torque to as great or greater extent than with the usual transmissions.

We claim:

1. A transmission mechanism comprising a driving shaft having a pair of sections, a driven shaft associated with one of said sections, a speed changing and torque multiplying mechanism having a movable element associated with one of said shaft sections and said driven shaft for driving one by the other, means slidably disposed on one of said shaft sections for connecting the two sections thereof together for operation as a unit, and a slidable collar controlled by said last mentioned means for preventing the rotational movement of the aforesaid movable element of said speed changing and torque multiplying mechanism.

2. In a transmission mechanism, the combination of a drive shaft, a driven shaft and an intermediate shaft, manually controlled transmission means between said drive shaft and intermediate shaft including a plurality of forward speeds and a reverse and variable transmission means between said intermediate shaft and driven shaft automatically controlled by the speed and load of the latter.

3. In a transmission mechanism, the combination of a drive shaft, a driven shaft and an intermediate shaft, manually controlled transmission means between said drive shaft and intermediate shaft including a plurality of forward speeds and a reverse, and variable transmission means between said intermediate shaft and driven shaft for automatically increasing torque with decrease in speed or increase of load of the driven member.

4. In a transmission mechanism, the combination of a drive shaft, a driven shaft and an intermediate shaft, manually controlled transmission means between said drive shaft and intermediate shaft including a plurality of forward speeds and a reverse, progressively variable transmission means between said intermediate shaft and driven shaft, and means automatically controlled by said driven shaft for increasing and decreasing torque respectively on and in proportion to decrease and increase in speed or increase or decrease of load of said driven member.

5. In a transmission mechanism, the combination of a drive shaft, a driven shaft and an intermediate shaft, manually controlled transmission means between said drive shaft and intermediate shaft including a plurality of forward speeds and a reverse, progressively variable transmission means between said intermediate shaft and driven shaft, and means automatically controlled by said driven shaft for progressively increasing and decreasing torque respectively on and in proportion to decrease and increase of speed or increase or decrease of load of said driven member with a variation of the differential speed of said intermediate member and driven member from zero to a predetermined maximum.

6. In a transmission mechanism, the combination with a drive shaft, a driven shaft and an intermediate shaft, all in axial alignment, a counter shaft, transmission gearing cooperating with said drive shaft, counter shaft and intermediate shaft including one or more manually shiftable elements for a plurality of forward speeds and a reverse between said drive shaft and intermediate shaft including a direct clutching engagement between said shafts, a step-down planetary transmission between said intermediate shaft and driven shaft, a friction slip clutch also between said intermediate shaft and driven shaft, and means controlled by the speed and load of said driven shaft for varying the ratio of torque transmission through said planetary gearing and friction clutch to correspondingly vary the speed ratio between said intermediate shaft and driven shaft.

7. In a transmission mechanism, the combination of a drive shaft and a driven shaft in axial alignment and stepped one into the other, an internal gear wheel mounted on said driven shaft, a pinion on said drive shaft, a revoluble gear carrier having bearings on said drive shaft on opposite sides of said pinion, an annular gear eccentrically revolubly mounted in said carrier, having internal teeth in mesh with said pinion and external teeth in mesh with said internal gear, a friction slip clutch surrounding said carrier and including annular disks alternately connected to revolve with said carrier and with said internal gear, weighted lever arms mounted to revolve with said internal gear and actuated centrifugally to increase the pressure on said disks and means for preventing rotation of said carrier in a direction reverse to the rotation of said drive shaft.

8. In a transmission mechanism, the combination of a drive shaft and a driven shaft in axial alignment and stepped one into the other with roller bearings therebetween, an internal gear wheel mounted on said driven shaft, a pinion on said drive shaft, a revoluble gear carrier having roller bearings on said drive shaft on opposite sides of said pinion, an annular gear eccentrically revoluble in said carrier and having roller bearings thereon, said annular gear having internal teeth in mesh with said pinion and external teeth in mesh with said internal gear, a drum secured to said internal gear wheel surrounding the same and said gear carrier, an annular friction disk slip clutch between said drum and gear carrier having alternate disks engaged to revolve respectively with said members, weighted levers fulcrumed in said drum and adapted to be centrifugally operated to increase the frictional engagement of said disks and an overrunning clutch permitting rotation of said carrier in the direction of rotation of said drive shaft but preventing reverse rotation.

9. In a transmission mechanism, the combination of a drive shaft, a driven shaft and an intermediate shaft all in axial alignment having a stepped roller bearing engagement with each other, an internal gear wheel mounted on said driven shaft, a pinion on said intermediate shaft, a revoluble gear carrier having roller bearings on said drive shaft on opposite sides of said pinion, an annular gear eccentrically revoluble in said carrier and having roller bearings thereon, said annular gear having internal teeth in mesh with said pinion and external teeth in mesh with said internal gear, a friction slip clutch surrounding said carrier and including annular disks alternately connected to revolve with said carrier and with said internal gear, weighted lever arms mounted to revolve with said internal gear and actuated centrifugally to increase the friction engagement of said disks, shiftable gears for driving said intermediate shaft from said drive shaft at different speed ratios and in different directions, an overrunning clutch for said gear carrier normally permitting rotation of the same in a forward direction but preventing reverse rotation, and means operated upon reversal of direction of rotation of said intermediate shaft for locking said gear carrier from forward rotation.

10. In a transmission mechanism, the combination of a drive shaft, a driven shaft and an intermediate shaft all in axial alignment having stepped roller bearing engagements with each other, an internal gear wheel mounted on said driven shaft, a pinion on said intermediate shaft, a revoluble gear carrier having roller bearings on said drive shaft on opposite sides of said pinion, an annular gear eccentrically revoluble in said gear carrier and having roller bearings thereon, said annular gear having internal teeth in mesh with said pinion, external teeth in mesh with said internal gear, a friction slip clutch surrounding said carrier and including annular disks alternately connected to revolve with said carrier and with said internal gear, weighted lever arms mounted to revolve with said internal gear and actuated centrifugally to increase the friction engagement of said disks, a counter shaft parallel to said drive shaft and intermediate shaft, shiftable gears on said counter shaft and intermediate shaft for establishing driving connections with the latter from said drive shaft in forward and reverse directions, an overrunning clutch for said gear carrier normally permitting the rotation of the same in a forward direction but preventing reverse rotation, and means actuated by the operation of said shiftable gears into reverse drive for locking said gear carrier from movement in a forward direction.

HORACE T. THOMAS.
JOHN BETHUNE.